(12) United States Patent
Chiang (10) Patent No.: US 11,556,187 B2
(45) Date of Patent: Jan. 17, 2023

(54) MOUSE DEVICE

(71) Applicant: Primax Electronics Ltd., Taipei (TW)

(72) Inventor: Hsiang-Mei Chiang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/362,084

(22) Filed: Jun. 29, 2021

(65) Prior Publication Data

US 2022/0365611 A1 Nov. 17, 2022

(30) Foreign Application Priority Data

May 11, 2021 (TW) ................................. 110117004

(51) Int. Cl.
*G06F 3/0354* (2013.01)
*F21V 8/00* (2006.01)
*G06F 3/02* (2006.01)

(52) U.S. Cl.
CPC ....... *G06F 3/03543* (2013.01); *G02B 6/0043* (2013.01); *G02B 6/0045* (2013.01); *G02B 6/0066* (2013.01); *G06F 3/0202* (2013.01)

(58) Field of Classification Search
CPC ............... G06F 3/03543; G06F 3/0202; G06F 3/03547; G02B 6/0043; G02B 6/0045; G02B 6/0066; G02B 6/00
USPC .......................................................... 345/156
See application file for complete search history.

(56) References Cited

U.S. PATENT DOCUMENTS

| 2006/0038776 A1* | 2/2006 | Ahn ..................... G06F 3/03547 345/156 |
| 2018/0329525 A1* | 11/2018 | Chang ................. G06F 3/03543 |
| 2019/0155407 A1* | 5/2019 | Yeh .......................... G02B 6/00 |

* cited by examiner

*Primary Examiner* — Abdul-Samad A Adediran
(74) *Attorney, Agent, or Firm* — Kirton McConkie; Evan R. Witt (57) ABSTRACT

A mouse device includes a casing, at least one aspheric light guide plate and a light source. The casing includes an upper cover and a base. The upper cover includes at least one lateral surface. The aspheric light guide plate is installed on the lateral surface of the upper cover. Each aspheric light guide plate includes a light input surface and a light output surface. The light input surface and the light output surface are not in parallel with each other. The light output surface is aligned with the corresponding lateral surface of the casing. The light source is installed on the light input surface of at least one aspheric light guide plate. The light source emits light beams. After the light beams are inputted into the aspheric light guide plate through the light input surface, the light beams are outputted from the light output surface.

14 Claims, 6 Drawing Sheets

MOUSE DEVICE

FIELD OF THE INVENTION

The present invention relates to a mouse device, and more particularly to a luminous mouse device.

BACKGROUND OF THE INVENTION

A mouse is used to control a cursor on a computer screen in order to operate the computer. Since 1968, the United States has produced the world's first mouse. After then, the mouse is applied to paper processing operations, video games, industrial drawings, drawing design or media production. Consequently, the mouse has become an indispensable part of the computer system. In the early stage, the mouse device uses a trackball to detect the displacement of the mouse. With increasing development of science and technology, an optical module or a laser module is used to detect the displacement of the mouse device in order to enhance the working efficiency. Moreover, for increasing the functionality and convenience of the mouse device, the earliest wired single-button mouse device is gradually evolved into the modern wireless multi-button roller mouse device. For complying with different industrial needs or personal preferences, various electronic manufacturers have begun to create a variety of mouse device devices with different shapes in order to meet the operation requirements of different users.

Recently, with the prevalence of e-sports games, manufacturers have developed a lot of gaming mice that are specifically used in e-sports games. As known, the gaming mouse should have high sensitivity and high accuracy. In addition, the gaming mouse should be specially designed to have the ergonomic appearance and have the trendy and dazzling appearance. In order to provide the aesthetically-pleasing appearance of the gaming mouse, the general gaming mouse is usually equipped with optical elements on the housing. Due to the cooperation of the optical elements and corresponding light-emitting elements, the gaming mouse produces gorgeous and eye-catching visual effects. However, the conventional gaming mouse with optical effects still has some drawbacks. For example, the conventional gaming mouse only exhibits a slender-strip optical effect on the housing, exhibits a fixed luminous pattern on the housing, or only emits light beams from the bottom of the housing. In addition, the optical elements installed on the gaming mouse are produced by an injection molding process, so that the optical elements have 3D structural surfaces. Generally, this optical element has large volume and thickness. That is, the conventional gaming mouse is unable to meet the slimness requirements, and the manufacturing cost is high.

Therefore, there is a need of providing an improved mouse device in order to overcome the drawbacks of the conventional technology.

SUMMARY OF THE INVENTION

The present invention provides a mouse device with an aspheric light guide plate. The light beams from a light source are guided by the aspheric light guide plate. Consequently, the mouse device produces a surface lighting effect.

The other objects and advantages of the present invention will be understood from the disclosed technical features.

In accordance with an aspect of the present invention, a mouse device is provided. The mouse device includes a casing, at least one aspheric light guide plate and a light source. The casing includes an upper cover and a base, which are assembled with each other. The upper cover includes at least one lateral surface. The at least one aspheric light guide plate is installed on the corresponding lateral surface of the upper cover. Each aspheric light guide plate includes a light input surface and a light output surface. The light input surface and the light output surface are not in parallel with each other. The light output surface is aligned with the corresponding lateral surface of the casing. The light source is installed on the light input surface of at least one aspheric light guide plate. The light source emits light beams. After the light beams are inputted into the aspheric light guide plate through the light input surface, the light beams are outputted from the light output surface.

In an embodiment, the casing further includes a button plate. The upper cover is covered by the button plate. The upper cover is arranged between the button plate and the base. The at least one lateral surface of the upper cover is exposed outside the button plate. When the button plate is pressed down, the mouse device generates a button signal.

In an embodiment, the light input surface of the aspheric light guide plate includes a first input part and a second input part. The first input part and the second input part are located adjacent to each other. The first input part and the second input part are not in parallel with each other. The first input part is farther from the base. The second input part is closer to the base.

In an embodiment, the light source is installed on the first input part of the light input surface.

In an embodiment, the light source is installed on the second input part of the light input surface.

In an embodiment, the light source is installed on the first input part and the second input part of the light input surface.

In an embodiment, each aspheric light guide plate further includes a bottom surface. The bottom surface is located adjacent to the light input surface. The bottom surface is opposed to the light output surface. The bottom surface has plural diffusion microstructures.

In an embodiment, the upper cover further includes at least one recess. The at least one recess is concavely formed in the at least one lateral surface. The at least one aspheric light guide plate is accommodated within the corresponding recess.

In an embodiment, the at least one aspheric light guide plate includes two aspheric light guide plates, and the at least one lateral surface includes two lateral surfaces. The two lateral surfaces are opposed to each other. The two aspheric light guide plates are installed on the corresponding lateral surfaces, respectively.

In an embodiment, the upper cover further includes a first recess and a second recess. The first recess and the second recess are concavely formed in the two lateral surfaces, respectively. The two aspheric light guide plates are respectively accommodated within the first recess and the second recess.

In an embodiment, the light source includes plural light-emitting elements and a flexible circuit board. The plural light-emitting elements are electrically connected with the flexible circuit board. The flexible circuit board is electrically connected with a main circuit board of the mouse device.

In an embodiment, the light-emitting elements are light emitting diode dies or micro light emitting diode dies.

In an embodiment, the at least one aspheric light guide plate is made of polycarbonate (PC), poly methyl methacrylate (PMMA) or polystyrene (PS).

From the above descriptions, the present invention provides a mouse device. The mouse device comprises at least one aspheric light guide plate. The at least one aspheric light guide plate is installed on one lateral surface or two opposite lateral surfaces of the casing. The light beams from the light source are guided by the at least one aspheric light guide plate. Consequently, the mouse device produces a surface lighting effect through one lateral surface or two lateral surfaces of the casing. Due to this structural design, the light beams emitted by the light source can be extensively guided to the bottom position of the casing by the aspheric light guide plate. Consequently, a lighting effect like an underglow effect is generated. Since the aspheric light guide plate is thin and flat, the use of the aspheric light guide plate as the optical element of the mouse device to guide the light beams can save the space of the mouse device and achieve the slimness requirement. Moreover, the manufacturing cost is reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
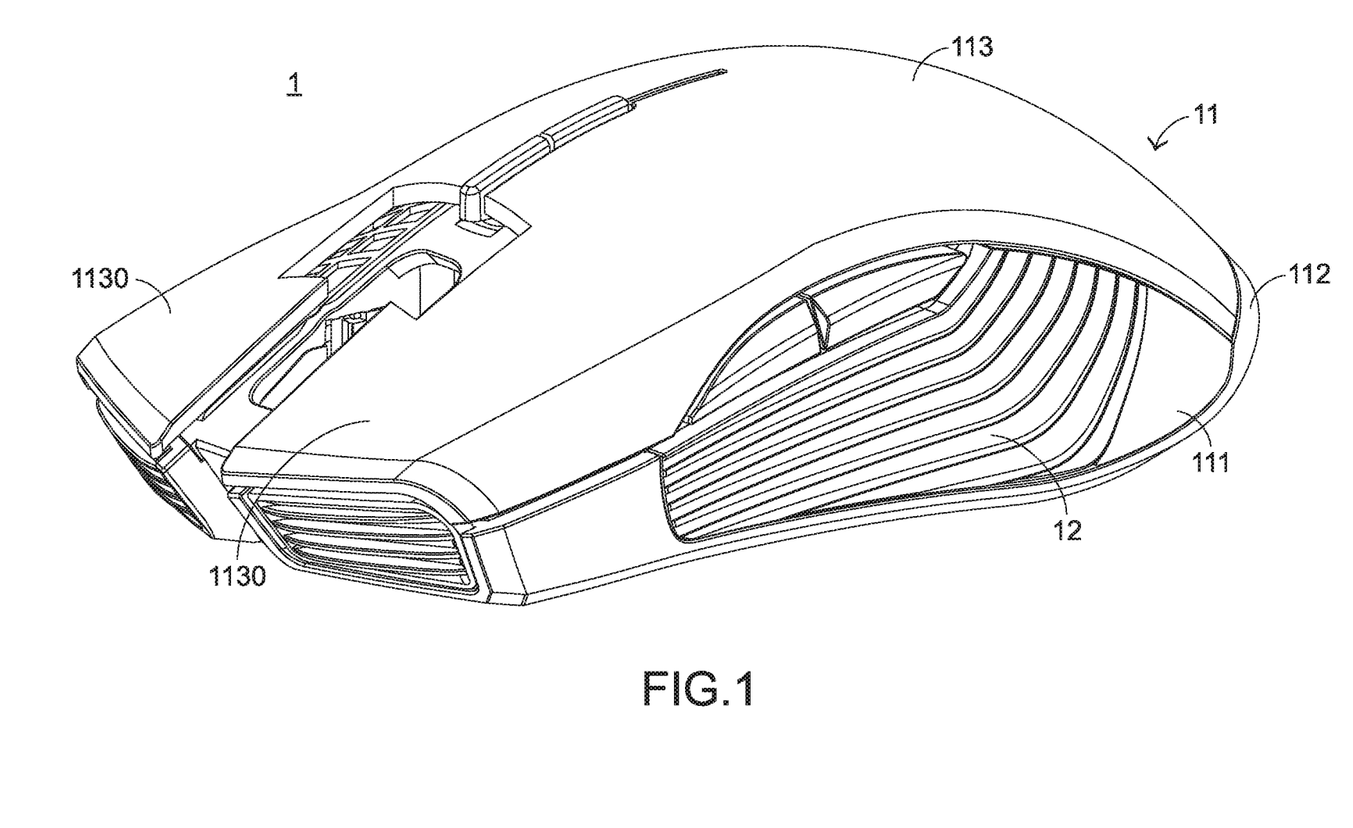
FIG. 1 is a schematic perspective view illustrating the appearance of a mouse device according to an embodiment of the present invention.
Figure 2:
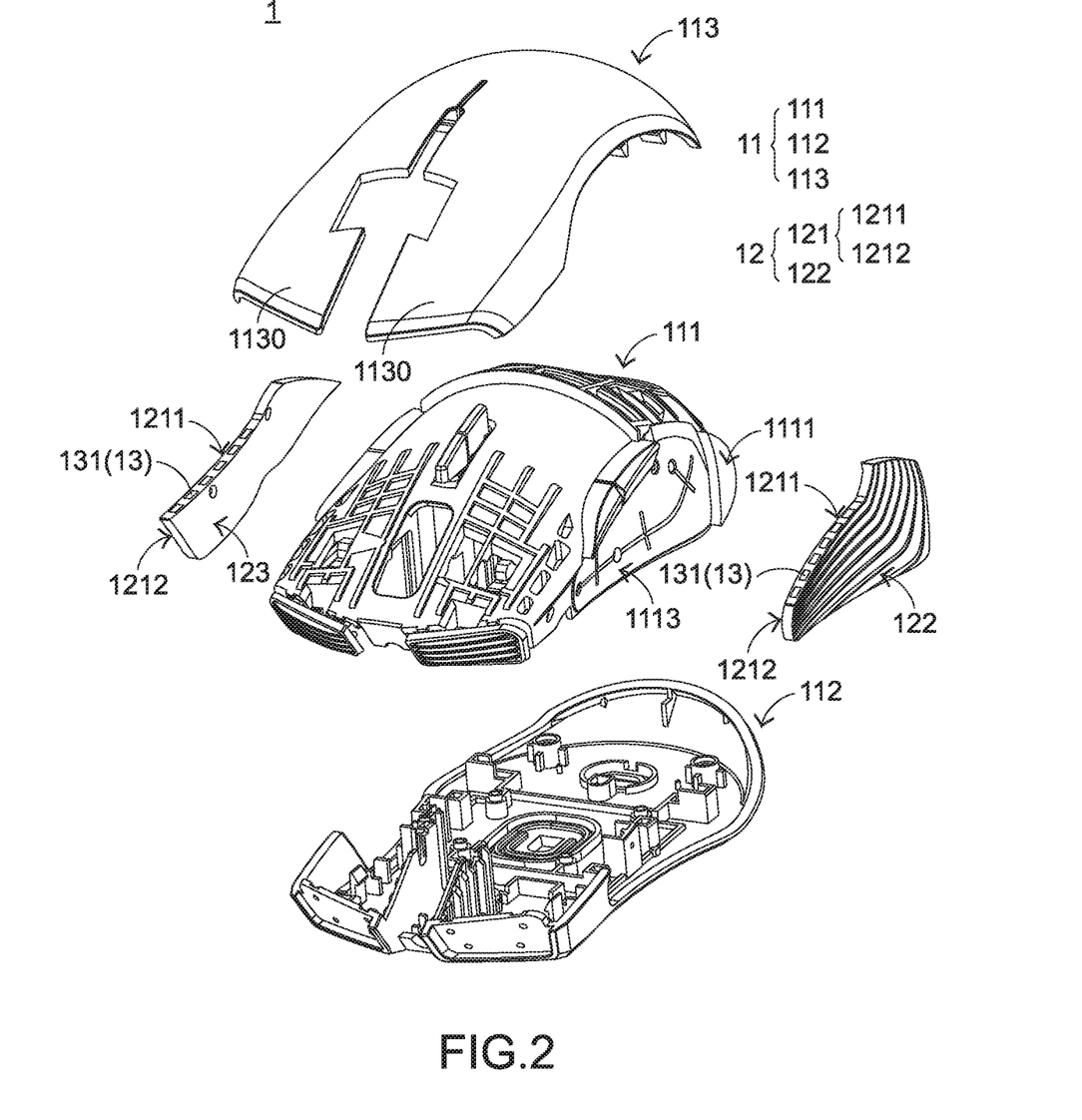
FIG. 2 is a schematic exploded view illustrating the mouse device as shown in FIG. 1.
Figure 3:
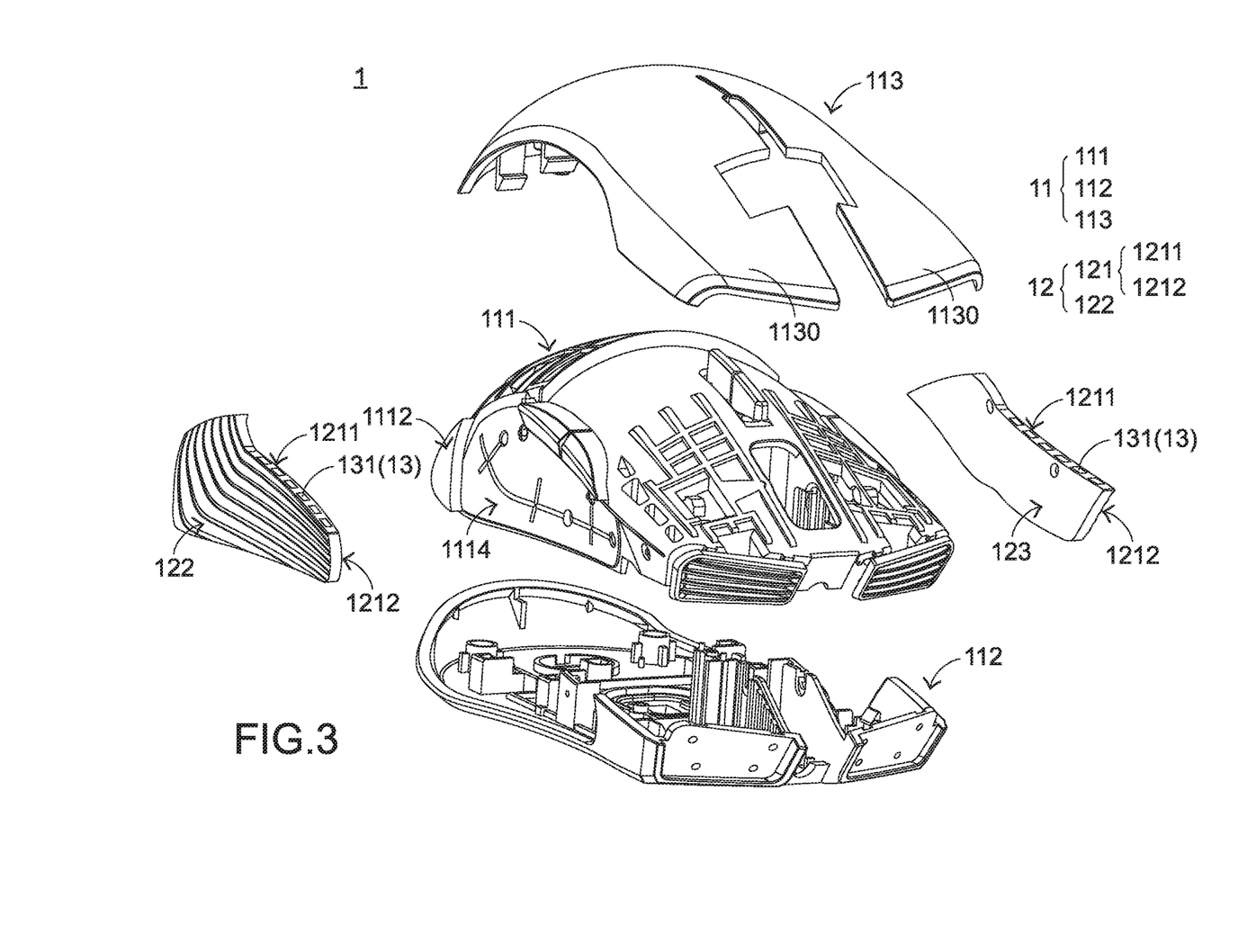
FIG. 3 is a schematic exploded view illustrating the mouse device as shown in FIG. 1 and taken along another viewpoint.
Figure 4:
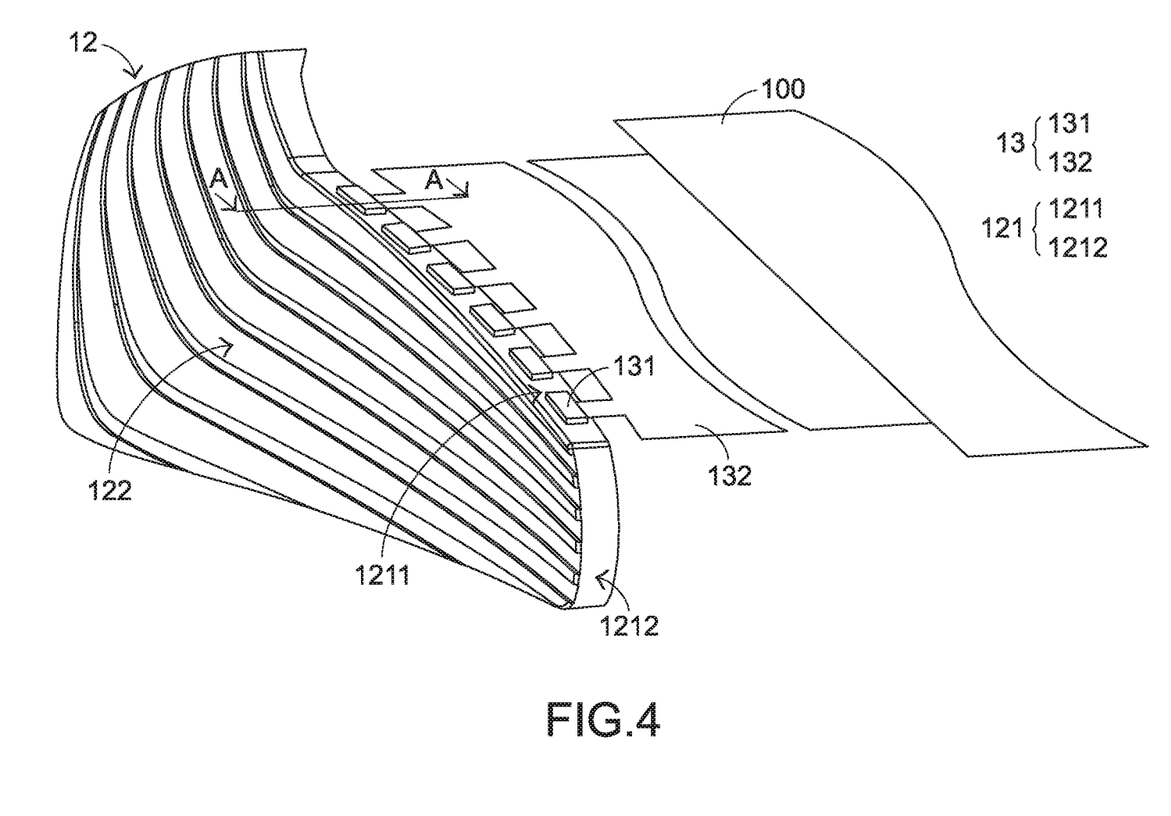
FIG. 4 schematically illustrates the relationship between the light source on the aspheric light guide plate as shown in FIGS. 2 and 3 and a circuit board.
Figure 5:
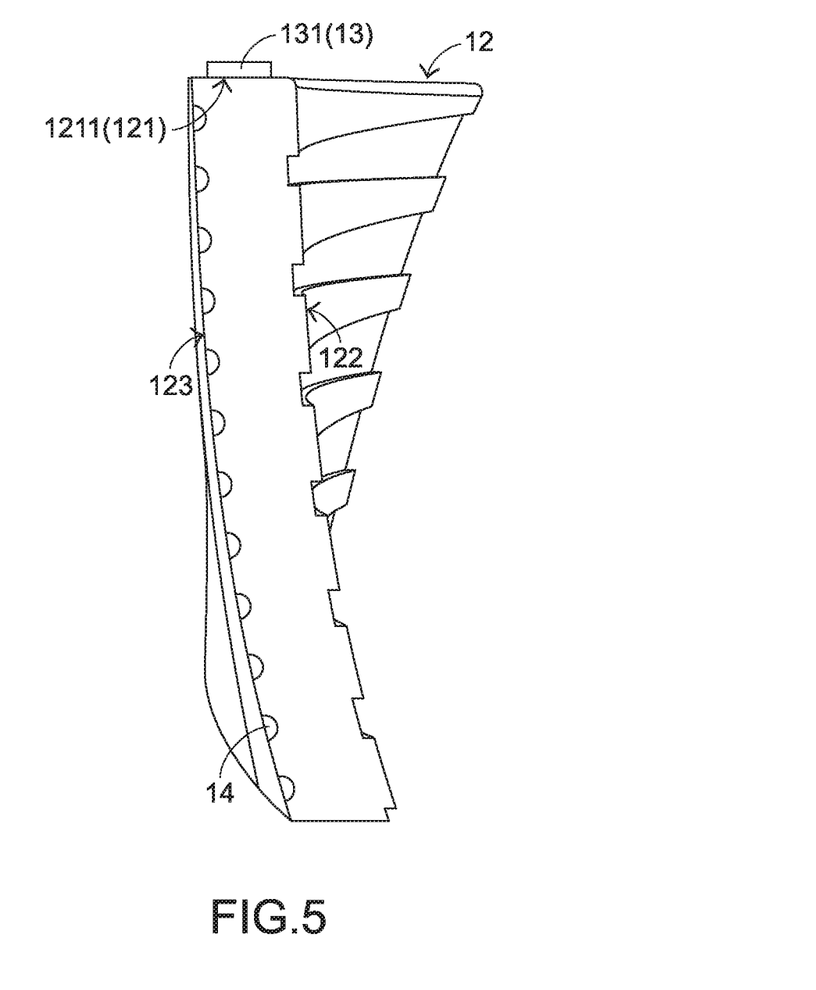
FIG. 5 is a schematic cross-sectional view illustrating a portion of the structure of FIG. 4 and taken along the line AA.

Please refer to FIGS. 1 to 5. FIG. 1 is a schematic perspective view illustrating the appearance of a mouse device according to an embodiment of the present invention. FIG. 2 is a schematic exploded view illustrating the mouse device as shown in FIG. 1. FIG. 3 is a schematic exploded view illustrating the mouse device as shown in FIG. 1 and taken along another viewpoint. FIG. 4 schematically illustrates the relationship between the light source on the aspheric light guide plate as shown in FIGS. 2 and 3 and a circuit board. FIG. 5 is a schematic cross-sectional view illustrating a portion of the structure of FIG. 4 and taken along the line AA.

Please refer to FIGS. 1 to 5 again. In an embodiment, the mouse device 1 comprises a casing 11, at least one aspheric light guide plate 12 and a light source 13. The casing 11 comprises an upper cover 111 and a base 112, which are assembled with each other. The upper cover 111 of the casing 11 comprises at least one lateral surface 1111. The aspheric light guide plate 12 is installed on the corresponding lateral surface 1111 of the upper cover 111. The aspheric light guide plate 12 comprises a light input surface 121 and a light output surface 122. The light input surface 121 and the light output surface 122 are not in parallel with each other. The light output surface 122 of the aspheric light guide plate 12 is aligned with the corresponding lateral surface 1111. That is, the light output surface 122 of the aspheric light guide plate 12 is substantially in parallel with the corresponding lateral surface 1111 of the casing 11. The light source 13 is installed on the light input surface 121 of the aspheric light guide plate 12. The light source 13 emits light beams into the aspheric light guide plate 12 through the light input surface 121. After the light beams are transferred through the aspheric light guide plate 12, the light beams are outputted from the light output surface 122.

In this embodiment, the mouse device 1 comprises two aspheric light guide plates 12. The two aspheric light guide plates 12 are installed on the lateral surface 1111 and another lateral surface 1112 of the upper cover 111, respectively. It is noted that the number of the aspheric light guide plates 12 is not restricted. That is, the number of the aspheric light guide plates 12 may be increased or decreased according to the practical requirements. For example, in some other embodiments, only one aspheric light guide plate 12 is installed on the corresponding lateral surface of the upper cover, or three aspheric light guide plates 12 are respectively installed on three lateral surfaces of the upper cover 111.

The detailed structure of the mouse device 1 will be described as follows.

Please refer to FIGS. 1, 2 and 3 again. In this embodiment, the casing 11 of the mouse device 1 further comprises a button plate 113. The button plate 113 is located over the upper cover 111 to cover the upper cover 111. That is, the upper cover 111 is arranged between the button plate 113 and the base 112. When the upper cover 111 is covered by the button plate 113, the two opposite lateral surfaces 1111 and 1112 of the upper cover 111 are exposed outside the button plate 113. The button plate 113 comprises plural button parts 1130. The button parts 1130 can be operated and pressed by the user. When one of the button parts 1130 is pressed down by the user, a switch (not shown) corresponding to the depressed button part 1130 is triggered. Consequently, a main circuit board (e.g., the main circuit board 100) electrically connected with the switch generates a button signal. The button signal is transmitted to a computing device (not shown) that is connected with the mouse device 1. According to the button signal, the computing device executes the corresponding command or function.

Please refer to FIGS. 1, 2 and 3 again. The upper cover 112 of the casing 11 further comprises a first recess 1113 and a second recess 1114. The first recess 1113 and the second recess 1114 are concavely formed in the lateral surfaces 1111 and 1112, respectively. The two aspheric light guide plates 12 are accommodated within the first recess 1113 and the second recess 1114, respectively. Especially, after the two aspheric light guide plates 12 are respectively accommodated within the first recess 1113 and the second recess 1114, the light output surface 122 of one aspheric light guide plate 12 is coplanar with the lateral surface 1111 and the light output surface 122 of the other aspheric light guide plate 12 is coplanar with the lateral surface 1112.

Please refer to FIGS. 1 to 5 again. The light input surface 121 of the aspheric light guide plate 12 comprises a first input part 1211 and a second input part 1212. The first input part 1211 and the second input part 1212 are located adjacent to each other. In addition, the first input part 1211 and the second input part 1212 are not in parallel with each other. In this embodiment, the first input part 1211 and the second input part 1212 are substantially perpendicular to each other.

In other words, the first input part 1211 is farther from the base 112, and the second input part 1212 is closer to the base 112. In an embodiment, the light source 13 is installed on the first input part 1211 of the aspheric light guide plate 12 only. It is noted that numerous modifications and alterations may be made while retaining the teachings of the invention. For example, in another embodiment, the light source is installed on the second input part 1212 of the aspheric light guide plate 12 only. Alternatively, the light source 13 is installed on the first input part 1211 and the second input part 1212 of the aspheric light guide plate 12. Preferably but not exclusively, the aspheric light guide plate 12 is made of polycarbonate (PC), poly methyl methacrylate (PMMA) or polystyrene (PS).

As shown in FIG. 4, the light source 13 comprises plural light-emitting elements 131 and a flexible circuit board 132. These light-emitting elements 131 are electrically connected with the flexible circuit board 132. In addition, the flexible circuit board 132 is electrically connected with the main circuit board 100 of the mouse device 1. Especially, the main circuit board 100 of the mouse device 1 is accommodated within an accommodation space between the upper cover 111 and the base 112 of the casing 11. These light-emitting elements 131 are electrically connected with the main circuit board 100 through the flexible circuit board 132. Since the flexible circuit board 132 is electrically connected with the main circuit board 100, the flexible circuit board 132 can be powered by the main circuit board 100. When the flexible circuit board 132 is powered by the main circuit board 100, the light-emitting elements 131 emit light beams to the aspheric light guide plates 12. For example, the light-emitting elements 131 are light emitting diode dies or micro light emitting diode dies.

In an embodiment, every three light-emitting elements 131 of these light-emitting elements 131 are encapsulated in a package structure. Especially, the three light-emitting elements 131 in each package structure include a red light emitting diode die, a green light emitting diode die or a blue light emitting diode die. That is, the package structure is a light source for emitting RGB primary color beams. Due to the package structure, the light beams from the RGB light emitting diode dies are mixed in the package structure. Consequently, the light beams with different color temperatures are generated, or the light changes of different color light beams are used to achieve the gradual lighting effect.

Please refer to FIGS. 1 to 5 again. The aspheric light guide plate 12 further comprises a bottom surface 123. The bottom surface 123 of the aspheric light guide plate 12 is located adjacent to the light input surface 121. In addition, the bottom surface 123 of the aspheric light guide plate 12 is opposed to the light output surface 122. That is, the bottom surface 123 is located at the side closer to the casing 11, and the light output surface 122 is located at the side farther from the casing 11. In this embodiment, the bottom surface 123 of the aspheric light guide plate 12 has plural diffusion microstructures 14. For example, the diffusion microstructures 14 are dots or other microstructures that can diffuse light beams. It is noted that the examples of the diffusion microstructures 14 are not restricted. In addition, the distribution density of the plural diffusion microstructures 14 can be adjusted according to different design requirements or different optical effect requirements. A first side of the light output surface 122 is closer to the light input surface 121. A second side of the light output surface 122 is farther from the light input surface 121 (i.e., at the position close to the base 112 of the casing 11). In order to further enhance the light output effect of the second side of the light output surface 122, the distribution density of the diffusion microstructures 14 is gradually increased from the first side of the light output surface 122 (i.e., the side closer to the light input surface 121) to the second side of the light output surface 122 (i.e., the side farther from the light input surface 121). Due to this structural design, the light beams emitted by the light source 13 can be uniformly guided to the bottom position of the casing 11 by the aspheric light guide plate 12. Consequently, a lighting effect like an under-glow effect is generated.

Figure 6:
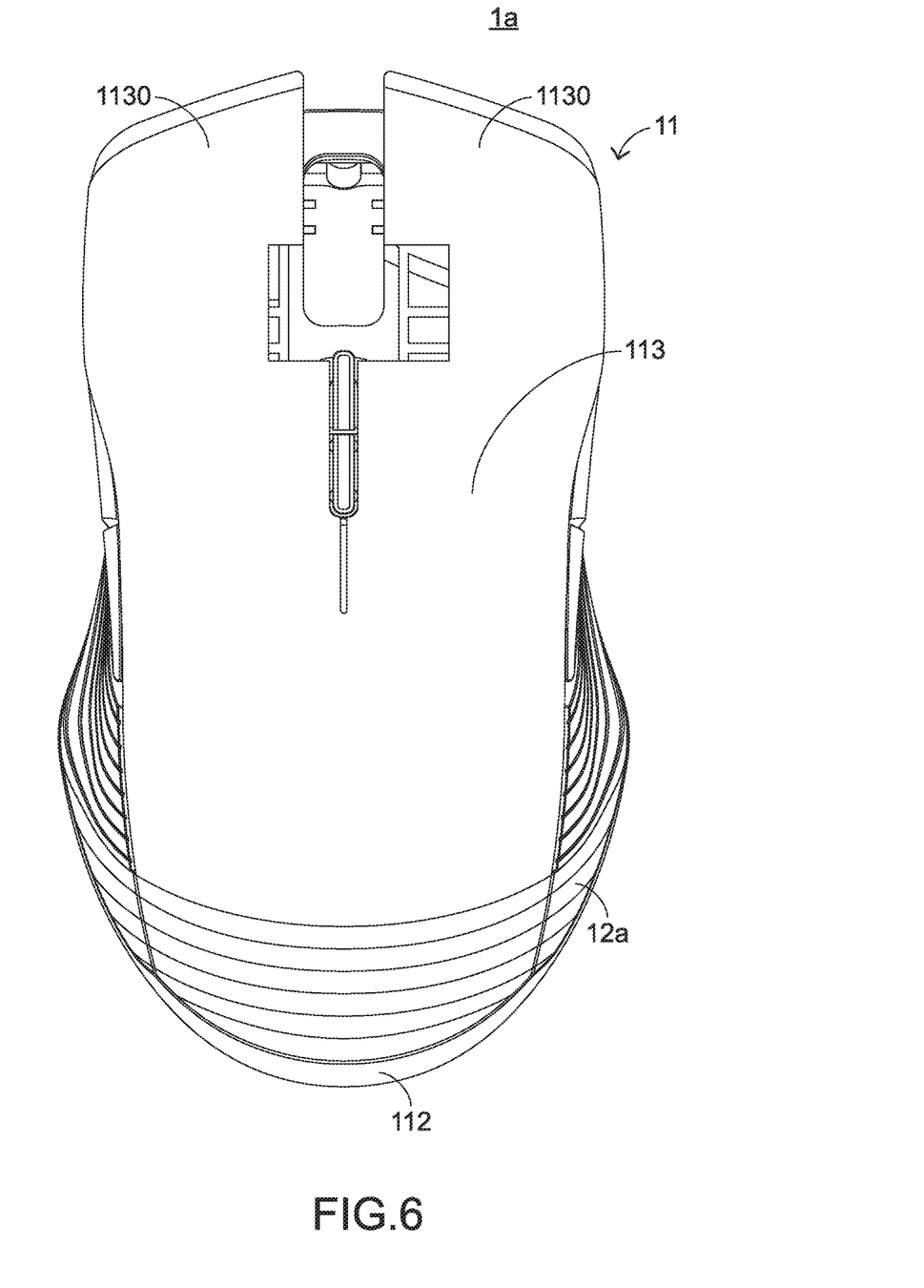
FIG. 6 is a schematic perspective view illustrating the appearance of a mouse device according to another embodiment of the present invention.

FIG. 6 is a schematic perspective view illustrating the appearance of a mouse device according to another embodiment of the present invention. As shown in FIG. 6, the structure of the mouse device 1a of this embodiment is similar to the structure of the mouse device 1 as shown in FIG. 1. In comparison with the mouse device 1, the aspheric light guide plate 12a of the mouse device 1a of this embodiment has a U-shaped profile. The installation position of the aspheric light guide plate 12a includes the two opposite lateral sides of the casing 11 and the surface between the two opposite lateral sides of the casing 11 (i.e., the surface of the tail side of the casing 11).

It is noted that the profiles of the aspheric light guide plate in the above examples are presented herein for purpose of illustration and description only. The profiles of the aspheric light guide plate are not restricted. That is, the profiles of the aspheric light guide plate may be varied according to the practical requirements. For example, the aspheric light guide plate may be specially designed to have the logo profile of the manufacturer according to the demand of the manufacturer. Alternatively, the aspheric light guide plate may be specially designed to match the feel of gripping the mouse device.

From the above descriptions, the present invention provides a mouse device. The mouse device comprises at least one aspheric light guide plate. The at least one aspheric light guide plate is installed on one lateral surface or two opposite lateral surfaces of the casing. The light beams from the light source are guided by the at least one aspheric light guide plate. Consequently, the mouse device produces a surface lighting effect through one lateral surface or two lateral surfaces of the casing. Due to this structural design, the light beams emitted by the light source can be extensively guided to the bottom position of the casing by the aspheric light guide plate. Consequently, a lighting effect like an under-glow effect is generated. Since the aspheric light guide plate is thin and flat, the use of the aspheric light guide plate as the optical element of the mouse device to guide the light beams can save the space of the mouse device and achieve the slimness requirement. Moreover, the manufacturing cost is reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse device, comprising:
   a casing comprising an upper cover and a base, which are assembled with each other, wherein the upper cover comprises at least one lateral surface;
   at least one aspheric light guide plate installed on a corresponding lateral surface of the upper cover, wherein each aspheric light guide plate comprises a light input surface and a light output surface, the light input surface and the light output surface are not in parallel with each other, and the light output surface is aligned with a corresponding lateral surface of the casing, wherein each aspheric light guide plate further comprises a bottom surface, wherein the bottom surface is located adjacent to the light input surface, and the bottom surface is opposed to the light output surface, wherein the bottom surface has plural diffusion microstructures; and a light source installed on the light input surface of each aspheric light guide plate, and the light source emits light beams, wherein after the light beams are inputted into each aspheric light guide plate through the light input surface, the light beams are outputted from the light output surface.

2. The mouse device according to claim 1, wherein the casing further comprises a button plate, and the upper cover is covered by the button plate, wherein the upper cover is arranged between the button plate and the base, and the at least one lateral surface of the upper cover is exposed outside the button plate, wherein when the button plate is pressed down, the mouse device generates a button signal.

3. The mouse device according to claim 1, wherein the light input surface of each aspheric light guide plate comprises a first input part and a second input part, wherein the first input part and the second input part are located adjacent to each other, and the first input part and the second input part are not in parallel with each other, wherein the first input part is farther from the base, and the second input part is closer to the base.

4. The mouse device according to claim 3, wherein the light source is installed on the first input part of the light input surface.

5. The mouse device according to claim 3, wherein the light source is installed on the second input part of the light input surface.

6. The mouse device according to claim 3, wherein the light source is installed on the first input part and the second input part of the light input surface.

7. The mouse device according to claim 1, wherein the upper cover further comprises at least one recess, wherein the at least one recess is concavely formed in the at least one lateral surface, and each aspheric light guide plate is accommodated within the corresponding recess.

8. The mouse device according to claim 1, wherein each aspheric light guide plate comprises two aspheric light guide plates, and the at least one lateral surface comprises two lateral surfaces, wherein the two lateral surfaces are opposed to each other, and the two aspheric light guide plates are installed on the corresponding lateral surfaces, respectively.

9. The mouse device according to claim 8, wherein the upper cover further comprises a first recess and a second recess, wherein the first recess and the second recess are concavely formed in the two lateral surfaces, respectively, wherein the two aspheric light guide plates are respectively accommodated within the first recess and the second recess.

10. The mouse device according to claim 1, wherein the light source comprises plural light-emitting elements and a flexible circuit board, wherein the plural light-emitting elements are electrically connected with the flexible circuit board, and the flexible circuit board is electrically connected with a main circuit board of the mouse device.

11. The mouse device according to claim 10, wherein the light-emitting elements are light emitting diode dies or micro light emitting diode dies.

12. The mouse device according to claim 1, wherein each aspheric light guide plate is made of polycarbonate (PC), poly methyl methacrylate (PMMA) or polystyrene (PS).

13. A mouse device, comprising:
a casing comprising an upper cover and a base, which are assembled with each other, wherein the upper cover comprises at least one lateral surface;
at least one aspheric light guide plate installed on a corresponding lateral surface of the upper cover, wherein each aspheric light guide plate comprises a light input surface and a light output surface, the light input surface and the light output surface are not in parallel with each other, and the light output surface is aligned with a corresponding lateral surface of the casing; and
a light source installed on the light input surface of each aspheric light guide plate, and the light source emits light beams, wherein after the light beams are inputted into each aspheric light guide plate through the light input surface, the light beams are outputted from the light output surface, wherein the light source comprises plural light-emitting elements and a flexible circuit board, wherein the plural light-emitting elements are electrically connected with the flexible circuit board, and the flexible circuit board is electrically connected with a main circuit board of the mouse device.

14. The mouse device according to claim 13, wherein the light-emitting elements are light emitting diode dies or micro light emitting diode dies.

* * * * *